(12) United States Patent
Kosa et al.

(10) Patent No.: US 6,198,216 B1
(45) Date of Patent: Mar. 6, 2001

(54) ELECTROLUMINESCENT LAMPS HAVING IMPROVED INTERFACIAL ADHESION

(75) Inventors: Bruce G. Kosa, Woodstock; Allen F. Horn, III, Danielson; Candace G. Socha, Woodstock, all of CT (US)

(73) Assignee: World Properties, Inc., Lincolnwood, IL (US)

( * ) Notice: Subject to any disclaimer, the term of this patent is extended or adjusted under 35 U.S.C. 154(b) by 0 days.

(21) Appl. No.: 09/221,885

(22) Filed: Dec. 28, 1998

Related U.S. Application Data

(60) Provisional application No. 60/070,558, filed on Jan. 6, 1998.

(51) Int. Cl.[7] .................................................... H01J 1/62
(52) U.S. Cl. .......................................... 313/503; 313/509
(58) Field of Search .................................. 313/503, 506, 313/509, 512, 504; 428/690, 917

(56) References Cited

U.S. PATENT DOCUMENTS

| | | |
|---|---|---|
| 4,929,704 | 5/1990 | Schwark . |
| 4,950,950 * | 8/1990 | Perry et al. ........................... 313/504 |
| 5,001,090 | 3/1991 | Schwark . |
| 5,024,533 | 6/1991 | Schwark . |
| 5,032,649 | 7/1991 | Schwark . |
| 5,155,181 | 10/1992 | Schwark . |
| 5,393,815 * | 2/1995 | Takeda et al. ........................ 524/262 |
| 5,418,062 | 5/1995 | Budd . |
| 5,439,705 | 8/1995 | Budd . |
| 5,552,668 | 9/1996 | Hirose et al. . |
| 5,558,908 * | 9/1996 | Luckacs, III et al. ............... 427/228 |
| 5,593,782 | 1/1997 | Budd . |
| 5,612,414 | 3/1997 | Becker et al. . |
| 5,616,650 | 4/1997 | Becker et al. . |
| 5,761,367 * | 6/1998 | Matsumoto .......................... 385/128 |
| 5,843,526 * | 12/1998 | Lukacs, III et al. ................. 427/228 |

FOREIGN PATENT DOCUMENTS

WO 9935889 * 7/1999 (WO) ................................... 428/690

OTHER PUBLICATIONS

"CERASET™ Inorganic Polymers Hybrid Inorganic/Organic Resin Systems", *Tech Bull CERASET™ Inorganic Polymers*, http://www.lanxide.com/Ceraset/tbcer3.htm, 6 pages, Dec. 30, 1997.

"CERASET™ SN Inorganic Polymer Ceramic Precursor and Binder Applications: SiC and $Si_3N_4$ Precursors", *Tech Bull* CERASET™ SN *Inorganic Polymer*, http://www.lanxide.com/Ceraset/tbcer2a.htm, 9 pages, Dec. 30, 1997.

DUREL® 3 Electroluminescent System, Product Selector Guide, 1995.

International Search Report of International Application No. PCT/US98/27485, Mar. 1, 1999.

* cited by examiner

*Primary Examiner*—Michael H. Day
*Assistant Examiner*—Todd Reed Hopper
(74) *Attorney, Agent, or Firm*—Cantor Colburn LLP

(57) ABSTRACT

An electroluminescent lamp is presented, wherein at least one of the phosphor layer or the dielectric layer comprises a polyureasilazane polymer. The polyureasilazane may be added to the fluoropolymer resin of the phosphor layer or the dielectric layer, and/or may be used to coat the phosphor particles within the phosphor layer or the inorganic filler particles within the dielectric layer. Use of polyureasilazanes confers enhanced adhesion and environmental resistance.

24 Claims, 1 Drawing Sheet

ELECTROLUMINESCENT LAMPS HAVING IMPROVED INTERFACIAL ADHESION

CROSS-REFERENCE TO RELATED APPLICATION

This application claims priority to U.S. patent application Ser. No. 60/070,558, filed Jan. 6, 1998.

BACKGROUND OF THE INVENTION

1. Field of the Invention

The present invention relates to electroluminescent lamps. In particular, the present invention relates to electroluminescent lamps having improved interfacial adhesion and improved environmental resistance.

2. Brief Summary of the Related Art

Electroluminescent lamps provide an attractive alternative to conventional lighting systems, especially for display and backlighting devices. An electroluminescent (hereinafter "EL") lamp is electrically similar to a capacitor. A typical EL lamp consists of a dielectric layer and a light-emitting phosphor layer sandwiched between two conductive surfaces, a transparent front electrode and a rear electrode. The primary purpose of the dielectric layer is to allow the lamp to withstand higher voltages without shorting between the conductive surfaces. The phospor layer comprises phosphor particles, typically zinc sulfide or other phosphorescent particles known in the art, suspended in a polymeric matrix. EL lamps illuminate when powered with alternating current (AC-power). As voltage is applied to the conductive surfaces, an electric field is generated across the phosphor and dielectric layers. Twice during each cycle electrons are excited from the valence band into the conduction band. Many of these excited electrons emit light through the transparent front electrodes as they return to their ground state.

One of the major technological barriers to widespread use of EL lamps has historically been their sensitivity to environmental conditions, particularly moisture. As is well-known, phosphor particles degrade in the presence of moisture, and thus must be protected from environmental humidity. One method of protecting phosphor particles has been to shield the particles by encapsulating the EL lamp assembly in a fused, water-resistant poly (chlorotrifluoroethylene) envelope. Another particularly successful method employs microencapsulation of the individual phosphor particles in a glass-like coating, as described in U.S. Pat. Nos. 5,593,782; 5,439,705; and 5,418,062 to Kenton D. Budd and assigned to Minnesota Mining and Manufacturing Company, the relevant portions of which are herein incorporated by reference. While microencapsulation has provided EL lamps with greatly improved resistance to environmental moisture, there still remains a need for additional methods to meet the exacting environmental performance standards required by many users of EL lamps.

SUMMARY OF THE INVENTION

The above-discussed and other deficiencies of the prior art are alleviated by the EL assembly and method of manufacture thereof according to the present invention, wherein at least one of the phosphor layer or the dielectric layer comprises a polyureasilazane polymer. The polyureasilazane may be added to the fluoropolymer resin of the phosphor layer or the dielectric layer, or the polyureasilazane may be used to coat the phosphor particles within the phosphor layer or the inorganic filler particles within the dielectric layer, or a combination of the preceding may be used. The polyureasilazane provides better adhesion between and within the layers, probably due to forming a covalent chemical bond between the ceramic filler and the fluoropolymeric matrix. Covalent bonding between the filler and matrix is expected to improve environmental resistance, particularly to high humidity. Polyureasilazane may also be used in other EL assembly layers described below.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
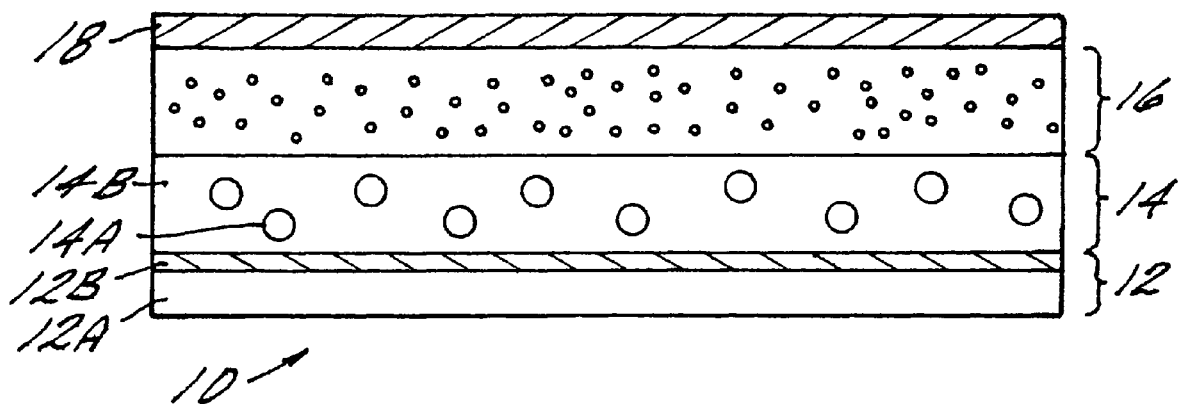
FIG. 1 is a schematic diagram of an EL lamp assembly in accordance with the present invention.

An EL assembly according to the present invention is shown generally at FIG. 1, comprising a front transparent electrode 12, a light-emitting phosphor layer 14, a dielectric layer 16, and rear electrode 18. Front transparent electrode 12 itself comprises a transparent substrate layer 12A and an electrode layer 12B. Transparent substrate 12A is typically a hard plastic such as polyethylene terepthalate. A preferred transparent substrate material is available from E. I DuPont de Nemours under the trade name MYLAR. Electrode layer 12B is typically indium tin oxide (ITO) deposited onto transparent substrate layer 12A by methods known in the art, for example by sputtering.

Light-emitting phosphor layer 14 is formed by printing luminescent ink onto the transparent electrode layer 12B. The luminescent ink comprises luminescent particles 14A in a polymeric matrix 14B. The luminescent particles may be zinc sulfide (ZnS) doped with copper, or other compositions that exhibit fluorescence. Polymeric matrix 14B is typically a fluoride resin binder, for example polymers derived from vinylidene fluoride, ethylene fluoride, vinyl fluoride, ethylene trifluoride, ethylene chloride trifluoride, ethylene tetrafluoride, propylene hexafluoride, and the like, as well as copolymers (including terpolymers) of the preceding. Preferred resins include copolymers containing poly(vinylidene fluoride) (PvDF) available from Pennwalt Corporation under the trade names KYNAR 7201 and KYNAR 9301.

Dielectric layer 16 comprises a high dielectric composite material comprising a fluoride resin binder and an inorganic, particulate filler. Suitable fluoride resin binders include polymers derived from vinylidene fluoride, ethylene fluoride, vinyl fluoride, ethylene trifluoride, ethylene chloride trifluoride, ethylene tetrafluoride, propylene hexafluoride, and the like, as well as copolymers of the preceding. Preferred resins include copolymers containing poly(vinylidene fluoride) available from Pemuwalt Corporation under the trade names KYNAR 7201 and KYNAR 9301. The KYNAR PvDF copolymers are typically made into a screen printable ink by dissolution in an amount of about 20 to 50% by weight in a suitable solvent such as N,N-dimethylacetamicle (DMAc). Higher boiling point solvents, such as 2-butoxyethyl acetate (EB acetate) may also be added to decrease the solvent evaporation rate of the ink.

Suitable inorganic, particulate fillers include high dielectric materials such as barium titanate ($BaTiO_3$), titania ($TiO_2$) and the like. The inorganic particulate fillers are commonly pre-treated to reduce moisture uptake with compounds such as alkoxyorganosilanes, organotitanates, and zirconates. The use of organosilanes to improve moisture resistance of EL lamps is taught in U.S. Pat. No. 5,552,668 to Hirose et al., assigned to Seiko Precision, Inc., the relevant parts of which are incorporated herein by reference. Silicone resins are also sometimes added to the particulate-filled ink to reduce water absorption.

Rear electrode 18 is generally a screen-printable conductive ink and also comprises a polymeric composite, including for example a polyester, epoxy, or acrylic resin and a conductor such as carbon black, nickel, copper, or silver flake, fibers or particles.

In the manufacture of EL light assemblies, the transparent electrode layer 12B is formed on the transparent substrate 12A by evaporative methods such as sputtering. The phosphor layer 14 is then formed from a luminescent ink onto electrode layer 12B by screen printing or other methods known in the art, and heated and dried. A dielectric ink formed by mixing the high dielectric filler into the resin binder, along with additives known in the art, then applied to the surface of phosphor layer 14, heated, and dried. Finally, the rear electrode is also applied to the assembly in the form of a conductive ink, heated, and dried.

Figure 2:
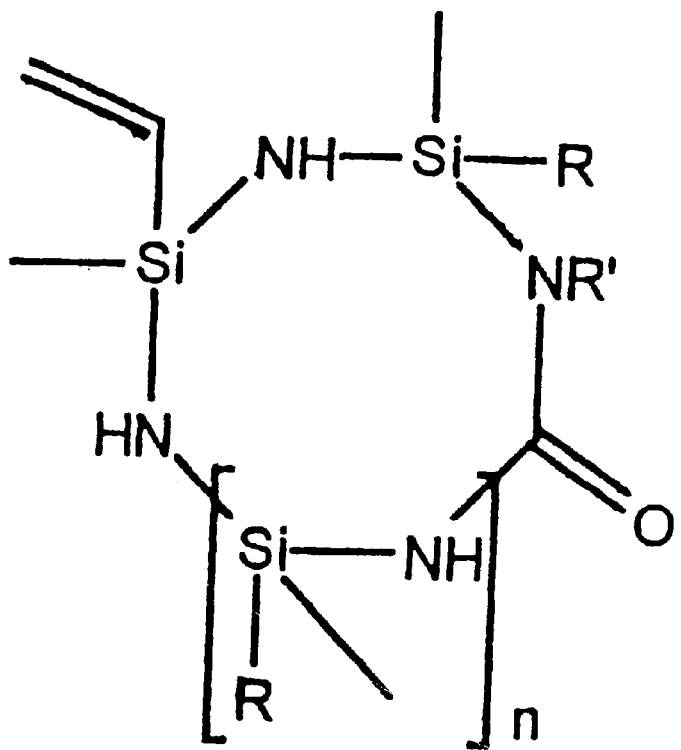
FIG. 2 is the structure of a polyureasilazane useful in accordance with the present invention.

In accordance with the present invention, in an EL assembly at least one of the phosphor layer or the dielectric layer further comprises a polyureasilazane polymer. The polyureasilazane polymer confers greater adhesion, as well as improved environmental resistance. Polyureasilazane have the structure shown in FIG. 2, wherein R is hydrogen or —CH=$CH_2$, and n is an integer from 1 to about 20. Synthesis and reaction of suitable polyureasilazanes are described in U.S. Pat. Nos. 4,929,704; 5,001,090; 5,021,533; 5,032,649; 5,155,181; 5,612,414; and 5,616,650. the relevant portions of each patent being herein incorporated by reference. A preferred polyureasilazane is available from Lanxide Performance Materials, Newark, Delaware, under the trade name CERASET.

Without being bound by theory, it is hypothesized that the surprising advantages in using polyureasilazanes accrues from the multiple functional groups present in polyureasilazanes, in particular the ureasilazane moieties (Si—NH—CO—NR—). These functional groups may react with the matrix resins present in the various assembly layers. Polyureasilazanes may also strongly associate with ceramic, metal, and metal oxide surfaces. Thus, the combination of reaction with polymer and association with ceramic, metal, and metal oxide surfaces provides enhanced adhesion upon exposure to high temperature and high humidity environments.

The polyureasilazane may be added to the fluoropolymer resin of the phosphor layer or the fluoropolymer resin of the dielectric layer. When added to the fluoropolymer resin portions of these layers, the polyureasilazane serves to increase adhesion between the ITO electrode layer and the phosphor layer, as well as adhesion between the phosphor particles and the polymeric matrix and the filler particles and the polymeric matrix. The polyureasilazane is added to the ink in an amount of between about 0.01% to about 10% by weight on a dry solids basis. Preferably, the polyureasilazane is added to the ink in an amount of between about 0.01% to about 0.5% by weight on a dry solids basis, in order to optimize adhesion, while minimizing discoloration of the ink. An amount of about 1% by weight on a dry solids basis of polyureasilazane results in an ink having a pale yellow color. Addition of polyureasilazane to fluoropolymer inks results in foaming and gelation, indicative of reaction (crosslinking) with the fluoropolymer resin.

When used to coat the phosphor particles of the phosphor layer or the inorganic filler particles of the dielectric layer, the particles are treated with polyureasilazane to provide particles that are used in a ratio in the range from about 0.5:1 to about 4:1 particles:fluoropolymer by weight, and preferably a ratio of about 0.8:1 to 3:1. Coupons of the dielectric layer made with this ratio of filler and polyureasilazane exhibit flex and tensile moduli higher than coupons made with conventional silane-treated particles. Use of the polyureasilazane polymer provides therefore provides enhanced adhesion between the filler and the polymeric matrix, as well as enhanced hydrolytic stability.

The following non-limiting examples will further serve to illustrate the present invention.

EXAMPLES

Example 1

Adhesion to ITO Layer

A screen printable ink was prepared consisting of 25 weight % KYNAR 7201 PVdF copolymer dissolved in a mixture of 66 weight % DMAc and 9 weight % EB acetate. Either 0.1% or 0.5% CERASET polyureasilazane by weight on a dry solids basis was added to the KYNAR 7201 ink. The inks were allowed to sit either 20 minutes or overnight after mixing, and then coated onto the electrode side of coupons of a transparent front electrode consisting of Mylar sputtered with indium tin oxide. After coating, the assembly was dried in an oven at 150° C. for 30 minutes. All inks containing CERASET were visibly more yellow in color than inks without the addition of a polyureasilazane. After drying, two coupons were placed such that the luminescent ink sides were in contact, and laminated together at 150° C. for 20 minutes at 100 psi in a laboratory press. Adhesion was measured using the Luster-Jordan 90° peel strength tester on ½-inch wide strips formed by cutting through the top sheet of Mylar and part way into the KYNAR layer ("Run 1"). The entire experiment was repeated abut one week later ("Run 2") in order to verify the results. The data are shown in the Table below.

|  | 90° Peel Strength, pli | |
| --- | --- | --- |
| Composition (Induction time) | Run 1 | Run 2 |
| No additives | 0 | 0.1 |
| 0.1% CERASET (20 minutes) | 0.2 | <0.1 |
| 0.5% CERASET (20 minutes) | 0 | 0 |
| 0.1% CERASET (24 hours) | 0.8 | 0.8 |
| 0.5% CERASET (24 hours) | 0.7 | 2.3 |

The above data indicate that an induction time of greater than 20 minutes after mixing of the polyureasilazane is required in order to obtaining bonding better than that of the control. The data also show that the addition of a polyureasilazane polymer significantly improves adhesion at higher concentrations, although with the potentially undesirable side effect of "yellowing" the resin color.

Example 2

Treatment of Filler by Adsorption

Higher modulus, higher strength, and lower ultimate elongation are generally accepted as indications of stronger adhesion between filler and polymeric matrix. (L. E. Nielsen & R. F. Landel, *Mechanical Properties of Polymers and Composites*, Second ed., Marcel Dekker, Inc., New York 1994, pp. 377–460). To test the effect of a polyureasilazane coating of the inorganic filler particles of the dielectric layer, barium titanate (available from Tam Ceramics under the designation COF-70) was treated by placing the titanate powder in a beaker and covering, it with a 1% and 5% by weight solution of CERA SET in N,N-dimethylacetamide (DMAc). After two days, the solution was decanted, and the powder samples dried in an oven at 110°C. for 4 hours. Inks comprising about 3:1 filler:resin were prepared with the CERASET-treated filler and used to make coupons by casting on Mylar, which were dried in an oven at 150° C. for 20 minutes. No yellowing of any of the coupons was observed. Evidently, pre-treating the fillers with the CERASET rather than adding it to the ink itself prevents yellowing.

Similar 3:1 filler:resin inks were also prepared using conventionally treated fillers for the purposes of comparison. The "AT-silane" sample was made using COF-70 barium titanate that was pre-treated with a proprietary organotrialkoxysilane compound. The "RJ-silicone" sample was prepared by adding a proprietary silicone resin to the mixture of "untreated" COF-70 barium titanate and KYNAR 7201 ink. The "untreated" sample simply using the COF-70 filler as received from the manufacturer.

Water absorption of the undensified coupons was measured and is reported in the Table below.

The coupons were also plied up to about 0.040 inches, and laminated at 150° C. at 330 psi in a laboratory press. "Dog bone" shaped samples were cut for tensile testing at a rate of 0.05 inches per minute. The sample with untreated filler was too fragile and brittle to cut for a test specimen. Results are also reported in the Table below.

Finally, the samples were molded to approximately 0.060 inch thick plaques in a 4-inch diameter disk mold at 375° C. at 330 psi for about 30 minutes. The samples were cut into 3-inch by ½-inch strips and tested for flexural modulus on an Instron set at a speed of 0.05 inches/minute with a 2-inch span. The results are reported in the Table below.

| Filler Treatment | Water Absorption, % | Tensile Strength, kpsi | % Elongation at Break | Flex Modulus, kpsi |
|---|---|---|---|---|
| None | 3.2 | — | — | 253 |
| RJ-Silicone | 2.1 | 0.63 | 7.5 | 175 |
| AT-Silane | 0.5 | 0.70 | 5.9 | 309 |
| 1% CERASET | 0.6 | 0.82 | 1.1 | 356 |
| 10% CERASET | 0.2 | 1.49 | — | 353 |

The above data clearly show that the treatment with polyureasilazane is as effective at reducing the water absorption of undensified coupons as the more expensive AT treatment. The increase in tensile strength and decrease in elongation at break indicate that the polyureasilazane treated materials cross-link with the fluoropolymer resin. The tensile strength data clearly indicate that the CERASET-treated filler actually couples chemically with the KYNAR 7201 fluoropolymner matrix. Other than the unexpectedly high flexural modulus value for the AT-treated filler, the flex modulus results also confirm that the polyureasilazane-treated filler exhibits coupling, with the fluoropolymer resin.

3. Treatment of Filler by Evaporative Adsorption

Ninety grams of either phosphor treated in accordance with the Budd patents referenced above or COF-70 barium titanate were placed in a 250-mL beaker and mixed thoroughly with a solution of CERASET in DMAc in an amount of 0.1%, 0.5%, or 1.0% CERASET by weight of the phosphor or filler powders. The beaker was then left in a hood overnight and the DMAc allowed to evaporate. The powders were dried in an oven at 110° C. for two hours, and deagglomerated using a mortar and pestle.

The treated filler was mixed with KYNAR 7201 ink in a ratio of about 3:1 filler:resin solids, cast on Mylar, dried, molded, and flex tested as described in Example 2. The treated phosphor was also mixed with KYNAR 7201 resin in a ratio of about 1.8:1 phosphor:resin on a dry weight basis, molded into samples and flex tested as in Example 2. The results are shown in the Table below.

| | Flex Modulus, kpsi | |
|---|---|---|
| Treatment | Treated Filler | Treated Phosphor |
| None | 153 | 50 |
| 0.1% CERASET | 171 | 50 |
| 0.5% CERASET | 150 | 39 |
| 1.0% CERASET | 216 | 41 |

The increase in flex modulus of the 1% CERASET treated sample is indicative of chemical coupling of the filler to the matrix. These results indicate that a minimum of about 1.0% polyureasilazane is required in order to obtain a noticeable increase in flexural modulus for the titanate fillers. No increase in flexural modulus in seen in the treated phosphors, although this is likely due to the low volume percent of filler loading in a 1.8:1 phosphor ink, and the very low (0.1 $m^2/gm$) surface area of the phosphor itself. Based on the evidence of chemical coupling found with the dielectric filler, it is still believed that CERASET-treatment of the phosphor also results in phosphor-fluoropolymer matrix chemical coupling and will also result in improved environmental resistance of the lamp assemblies.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An electroluminescent assembly, comprising
   a phosphor layer having a first side and a second side, wherein the phosphor layer comprises a phosphor and a first polymeric matrix; and
   a dielectric layer having a first side and a second side, the first side being disposed on the first side of the phosphor layer, and wherein the dielectric layer comprises a particulate filler and a second polymeric matrix; and further wherein
   at least one of the phosphor layer or the dielectric layer comprises a polyureasilazane.

2. The electroluminescent assembly of claim 1, further comprising
   a transparent substrate layer;
   a front electrode layer having a first side and a second side, the first side being disposed on the transparent substrate layer and the second side being disposed on the second side of the phosphor layer; and
   a rear electrode layer, wherein the rear electrode layer is disposed on the second side of the dielectric layer.

3. The electroluminescent assembly of claim 1, wherein the polyureasilazane has the structure

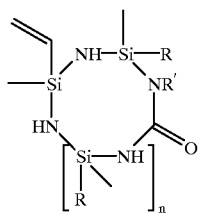

wherein R is hydrogen or vinyl, and n is an integer in the range from 1 to about 20.

4. The electroluminescent assembly of claim 1, wherein the polyureasilazane is mixed with the polymeric matrix of the phosphor layer or the polymeric matrix of the dielectric layer, or the polyureasilazane is associated with the phosphor or the particulate filler, or the polyureasilazane is mixed with at least one of the phosphor layer or the dielectric layer and is associated with at least one of the phosphor or the particulate filler.

5. The electroluminescent assembly of claim 1, wherein the polyureasilazane is adsorbed onto the particulate filler.

6. The electroluminescent assembly of claim 1, wherein the filler with adsorbed polyureasilazane is present in the dielectric layer in an amount of between about 0.5:1 and about 4:1 filler:resin by weight.

7. The electroluminescent assembly of claim 1, wherein the filler with adsorbed polyureasilazane is present in an amount of about 3:1 filler:resin by weight.

8. The electroluminescent assembly of claim 1, wherein the polyureasilazane is mixed into at least one of the polymeric matrix of the phosphor layer or the dielectric layer in an amount in the range from about 0.01% to about 10% by weight of the solids in the polymeric matrix.

9. An electroluminescent assembly, comprising
a phosphor layer having a first side and a second side, wherein the phosphor layer comprises a phosphor and a polymeric matrix; and
a dielectric layer having a first side and a second side, the first side being disposed on the first side of the phosphor layer, and wherein the dielectric layer comprises a filler and a polymeric matrix; and further wherein
at least one of the polymeric matrix of the phosphor layer or the polymeric matrix of the dielectric layer comprises a polyureasilazane.

10. The electroluminescent assembly of claim 9, further comprising
a transparent substrate layer;
a front electrode layer having a first side and a second side, wherein the first side of the front electrode layer is disposed on the transparent substrate layer and the second side of the front electrode layer is disposed on the second side of the phosphor layer; and
a rear electrode layer disposed on the second side of the dielectric layer.

11. The electroluminescent assembly of claim 9, wherein the polyureasilazane has the structure

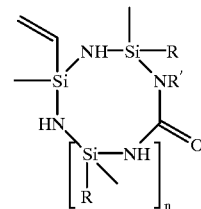

wherein R is hydrogen or vinyl and n is an integer in the range from 1 to about 20.

12. The electroluminescent assembly of claim 9, wherein the polyureasilazane is mixed into at least one of the polymeric matrix of the phosphor layer or the dielectric layer in an amount in the range from about 0.01% to about 10% by weight of the solids in the polymeric matrix.

13. An electroluminescent assembly, comprising
a phosphor layer having a first side and a second side, wherein the phosphor layer comprises a phosphor and a polymeric matrix;
a dielectric layer having a first side and a second side, wherein the dielectric layer comprises a filler and a polymeric matrix, and wherein the first side of the dielectric layer is disposed on the first side of the phosphor layer; and further wherein
at least one of the phosphor or the filler particles comprises a polyureasilazane.

14. The electroluminescent assembly of claim 13, further comprising
a transparent substrate layer;
a front electrode layer having a first side and a second side, wherein the first side is disposed on the transparent substrate layer and the second side is disposed on the second side of the phosphor layer; and
a rear electrode layer disposed on the second side of the dielectric layer.

15. The electroluminescent assembly of claim 13, wherein the polyureasilazane has the structure

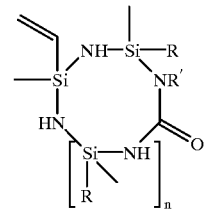

wherein R is hydrogen or vinyl and n is an integer in the range from 1 to about 20.

16. The electroluminescent assembly of claim 13, wherein the filler with polyureasilazane is present in the dielectric layer in an amount of between about 0.5:1 and about 4:1 filler:resin by weight.

17. The electroluminescent assembly of claim 13, wherein the filler with polyureasilazane is present in an amount of about 3:1 filler:resin by weight.

18. An electroluminescent assembly, comprising
a transparent substrate layer;
a front electrode layer having a first side and a second side, wherein the first side is disposed on the transparent substrate layer;
a phosphor layer having a first side and a second side, wherein the first side is disposed on the second side of the front electrode layer, and further wherein the phosphor layer comprises a phosphor and a first polymeric matrix;
a dielectric layer having a first side and a second side, wherein the first side is disposed on the second side of the phosphor layer, and further wherein the dielectric layer is a composite comprising a particulate filler and a second polymeric matrix; and
a rear electrode layer disposed on the second side of the dielectric layer; wherein
at least one of the phosphor layer or the dielectric layer comprises a polyureasilazane.

19. The electroluminescent assembly of claim 18, wherein the polyureasilazane has the structure

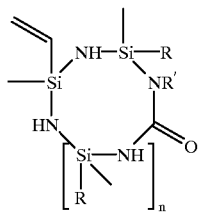

wherein R is hydrogen or vinyl and n is an integer in the range from 1 to about 20.

20. An electroluminescent assembly, comprising
a transparent substrate layer;
a front electrode layer having a first side and a second side, wherein the first side is disposed on the transparent substrate layer;
a phosphor layer having a first side and a second side, wherein the first side of the phosphor layer is disposed on the second side of the front electrode layer, and further wherein the phosphor layer comprises a phosphor and a second polymeric matrix;
a dielectric layer having a first side and a second side, wherein the first side is disposed on the second side of the phosphor layer, and further wherein the dielectric layer is a composite comprising a filler and a second polymeric matrix; and
a rear electrode layer disposed on the second side of the dielectric layer; wherein
at least one of the polymeric matrix of the phosphor layer or the polymeric matrix of the dielectric layer comprises a polyureasilazane.

21. The electroluminescent assembly of claim 20, wherein the polyureasilazane has the structure

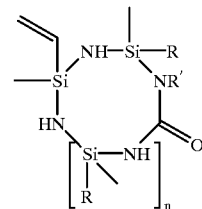

wherein R is hydrogen or vinyl and n is an integer in the range from 1 to about 20.

22. An electroluminescent assembly, comprising
a transparent substrate layer;
a front electrode layer having a first side and a second side, wherein the first side is disposed on the transparent substrate layer;
a phosphor layer having a first side and a second side, wherein the first side of the phosphor layer is disposed on the second side of the front electrode layer, and further wherein the phosphor layer comprises a phosphor and a second polymeric matrix;
a dielectric layer having a first side and a second side, wherein the first side is disposed on the second side of the phosphor layer, and further wherein the dielectric layer is a composite comprising a filler and a second polymeric matrix; wherein
at least one of the phosphor or the filler comprises a polyureasilazane.

23. The electroluminescent assembly of claim 22, wherein the polyureasilazane has the structure

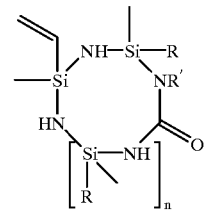

wherein R is hydrogen or vinyl and n is an integer in the range from 1 to about 20.

24. The electroluminescent assembly of claim 22, wherein the polyureasilazane is adsorbed onto the filler.

* * * * *